No. 847,697. PATENTED MAR. 19, 1907.
J. V. M. RISBERG.
MANUFACTURE OF BUTTER IN CENTRIFUGAL APPARATUS.
APPLICATION FILED MAR. 2, 1906.
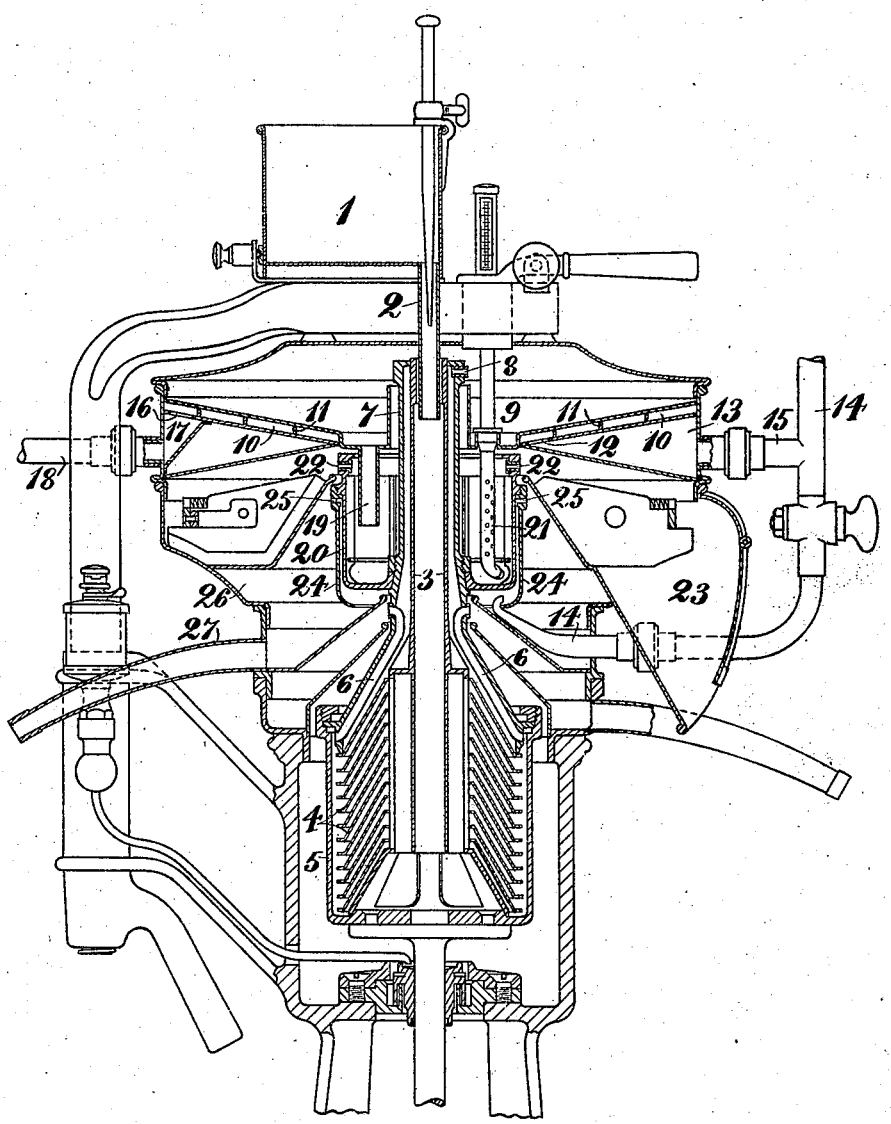

UNITED STATES PATENT OFFICE.

JOHANNES VALDEMAR MÅRTEN RISBERG, OF SÖDERTELJE, SWEDEN, ASSIGNOR TO AKTIEBOLAGET BALTIC-SEPARATOR, OF STOCKHOLM, SWEDEN.

MANUFACTURE OF BUTTER IN CENTRIFUGAL APPARATUS.

No. 847,697.     Specification of Letters Patent.     Patented March 19, 1907.

Application filed March 2, 1906. Serial No. 303,923.

*To all whom it may concern:*

Be it known that I, JOHANNES VALDEMAR MÅRTEN RISBERG, a subject of the King of Sweden, and a resident of Södertelje, in the Kingdom of Sweden, have invented certain new and useful Improvements in the Manufacture of Butter in Centrifugal Apparatus, of which the following is a specification.

In centrifugal apparatus now used for churning the cream is subjected, as is well known, to a tempering immediately before the churning operation. This is effected by the cream being subjected either to the action of a cooling medium, while in the churning vessel (the centrifugal drum seen in United States Letters Patent No. 582,437) or to the action of cooling medium before entering the churning vessel, the cream being then led to the said vessel and churned. (See United States Letters Patent No. 573,707.) In the cooling method first mentioned, or the internal cooling operation, the cream is worked at the same time it is cooled, the working being thus partly effected at a temperature very unsuitable (too high) for the churning operation, which has an unfavorable influence upon the consistency of the butter. In the cooling method last mentioned, or the external cooling operation, on the other hand, the said unsuitable working at too high a temperature is avoided; but instead of it the disadvantage arises that the cream must be cooled to a temperature considerably below the churning temperature in order that the temperature may not become too high owing to the heat generated during the churning operation. The temperature of the cream is, as well known, of great importance to the churning operation, and a difference of only 1° centigrade has a great influence upon the quality of the butter.

This invention relates to a procedure in continual churning in centrifugal apparatus through which the said disadvantages are removed, so that a constant churning temperature is maintained during the whole churning operation. This is gained by a combination of external cooling and cooling while the cream is in the churning vessel, the cream being before the churning operation—*i. e.*, before the entering of the cream into the churning vessel—cooled to the temperature suitable for the churning process and afterward, during the churning process, kept at the said temperature by the heat generated during the churning process being withdrawn—as, for instance, by means of a cooling device mounted in the churning vessel or by the said vessel being cooled from the outside.

In carrying out my invention the cream is separated in the skimming vessel and passes from the same into a cooling apparatus outside the centrifugal apparatus, in which it is brought to the temperature suitable for the churning. The cream is then continuously led into the churning vessel, in which it is worked to a butter-like mass in the known manner. The heat generated during the churning process is withdrawn, for instance, by means of a cooling device mounted in the churning vessel, so that the cream is kept at the temperature at which it enters the churning vessel—*i. e.*, is kept at a constant churning temperature. The heat generated in the churning vessel may be withdrawn also by the churning vessel being cooled from the outside.

When cooling of the cream is effected only in the churning vessel, as according to United States Letters Patent No. 582,437, the butter gets a consistency which is not attractive and by professional men is called "short," the said consistency resulting from a churning temperature which is sometimes too high. Experiments with my procedure have resulted in butter of unobjectionable consistency.

In order that the operation of churning according to this invention may be the better understood, reference can be had to the accompanying drawing, which shows in axial vertical section a centrifugal apparatus adapted for carrying out the described procedure.

The operation will be briefly described with reference to said drawing.

The full-milk from the vessel 1 enters the apparatus through a pipe 2 and passes downward through the axial tube 3 of known construction. From the tube 3 the milk passes between the conical plates 4 of the liner of a centrifugal drum 5. The skimmed or blue milk leaves the apparatus through the pipes 6 in the usual manner. The cream, on the other hand, ascends through the space between the axial tube 3 and a tube 7, which supports the churning-drum, escaping through the cream-screw 8.

9 is a stationary vessel provided with a double bottom 10, which is divided into a spiral channel by a helical partition-wall 11. One end of the said channel communicates through an opening 12 with a chamber 13. 14 is a pipe for cooling-water or other fluid of a temperature of about 16° centigrade. A branch 15 leads from the said pipe to the chamber 13. The other end of the said spiral channel communicates through an opening 16 with a chamber 17, provided with an outlet-pipe 18.

The cream thrown outward from the screw 8 strikes the wall of the vessel 9 and then passes inward along the upper side of the bottom 10, cooled by the water passing through its spiral channel, the cream being thus cooled to a temperature suitable for churning, or about 16° centigrade. From the vessel 9 the cooled cream passes downward through a pipe 19 into the churning apparatus. The said apparatus consists of the drum 20, supported by the tube 7 and rotating with the centrifugal drum 5, provided with the ordinary perforated churning-tube 21, which strips off the cream and throws the same in the shape of jets against the cream-surface in the drum, the cream being thus caused to circulate through the drum and the churning-tube 21 until worked to butter, which leaves the drum through the openings 22 and enters the stationary vessel 23. The said drum 20 is surrounded by another drum 24, which is open at the bottom and rotates with the drum. The pipe 14 for cooling-water leads to the lower part of the space between the two drums 20 and 24, and the water, having passed the said space, leaves the same through openings 25, entering a chamber 26, provided with an outlet-pipe 27. Thus the churning-drum 20 and the cream within the same are also cooled to the temperature (16° centigrade) suitable for churning, and a consistent churning temperature is maintained during the whole operation.

Having now described my invention, what I claim is—

The herein-described method of effecting and maintaining a constant churning temperature, in continual churning in a centrifugal apparatus, consisting in first cooling the cream, before it enters the churning vessel, to a suitable churning temperature, then, after the cream has been led into the churning vessel, maintaining this temperature thereof during the churning process by withdrawing the heat generated during the said process.

In testimony whereof I have signed my name to this specification in the presence of two subscribing witnesses.

JOHANNES VALDEMAR MÅRTEN RISBERG.

Witnesses:
CARL FRIBERG,
ROBERT APELGREN.